United States Patent [19]

Schmidt et al.

[11] Patent Number: 5,284,416
[45] Date of Patent: Feb. 8, 1994

[54] VACUUM LIFTER

[76] Inventors: Adolf Schmidt, Munsterweg 24, D-5160 Duren; Karl-Heinz Rechener, Wagnerstr. 18, D-5014 Kerpen-Sindorf, both of Fed. Rep. of Germany

[21] Appl. No.: 764,683

[22] Filed: Sep. 25, 1991

[30] Foreign Application Priority Data

Sep. 26, 1990 [DE] Fed. Rep. of Germany ... 9013529[U]

[51] Int. Cl.$^5$ ............................................. B66C 1/02
[52] U.S. Cl. ................................. 414/627; 294/64.1; 901/40
[58] Field of Search ........... 414/626, 627, 793, 793.1, 414/797, 752, 911, 752; 901/40; 294/64.1

[56] References Cited

U.S. PATENT DOCUMENTS

| | | | |
|---|---|---|---|
| 2,665,013 | 1/1954 | Socke | 414/627 |
| 3,351,370 | 11/1967 | Olson | 294/64 |
| 3,785,691 | 1/1974 | Sperry | 294/64.1 |
| 4,114,939 | 9/1978 | Burt | 294/64.1 |
| 4,266,905 | 5/1981 | Birk et al. | 901/40 X |

FOREIGN PATENT DOCUMENTS

| | | |
|---|---|---|
| 1152858 | 8/1963 | Fed. Rep. of Germany . |
| 2031427 | 12/1971 | Fed. Rep. of Germany ..... 294/64.1 |
| 2847473 | 12/1979 | Fed. Rep. of Germany . |
| 8435161 | 5/1985 | Fed. Rep. of Germany . |
| 1474798 | 12/1965 | France . |
| 2266648 | 4/1974 | France . |
| 2316177 | 7/1975 | France . |
| 122558 | 9/1979 | Japan ..................................... 294/64.1 |
| 626003 | 9/1978 | U.S.S.R. .............................. 294/64.1 |
| 656949 | 4/1979 | U.S.S.R. .............................. 294/64.1 |
| 787332 | 12/1980 | U.S.S.R. .............................. 294/64.1 |
| 2022550 | 12/1979 | United Kingdom . |

Primary Examiner—Frank E. Werner
Attorney, Agent, or Firm—Joseph W. Berenato, III

[57] ABSTRACT

The invention concerns a vacuum lifter to transport loads with an adhesion surface, comprising at least one suction head suspended from a hoist, said suction comprising at least one annular seal projecting from its suction side, the vacuum chamber(s) enclosed by the annular seal(s) communicating with a vacuum source, a valve furthermore being provided which can be switched between a suction position wherein the vacuum source communicates with the pressure chamber or vacuum chambers and a venting position wherein the communication with the vacuum source is interrupted and the vacuum chamber(s) is (are) vented or fed with compressed air. To assure venting or compressed-air supply immediately upon deposition of the load, the hoist is connected by a fitting 55 to the suction plate 5, said fitting being guided in vertically displaceable manner between two end positions, a sensor or a limit switch 59 being provided to detect the lower end position of the fitting 55 and so cooperating with a control means that following lowering of the fitting 55, the valve 20 shall be switched into the venting position if previously having been in the suction position.

19 Claims, 1 Drawing Sheet

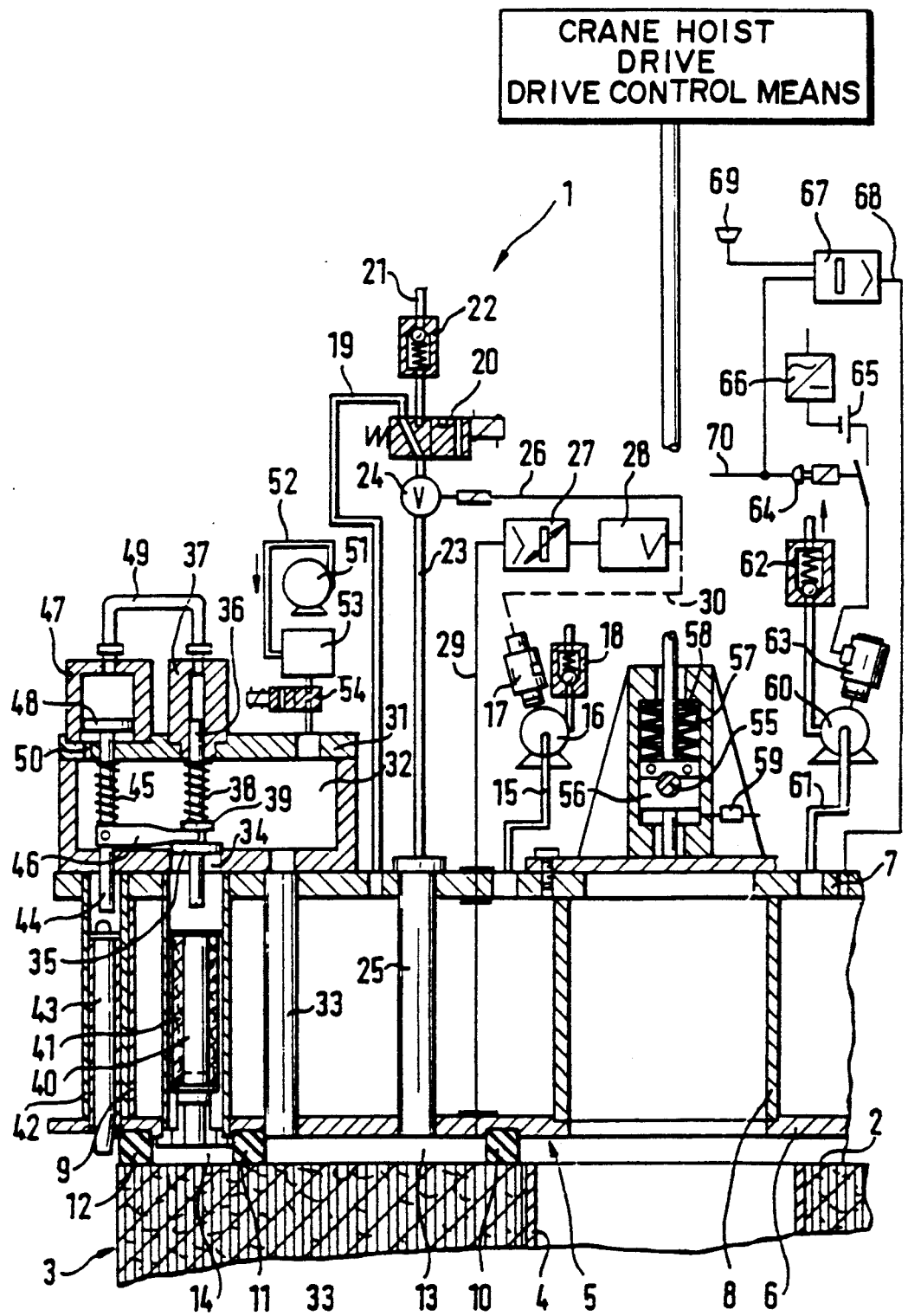

VACUUM LIFTER

The invention concerns a vacuum lifter to transport loads with an adhesion surface, which comprises at least one suction head suspended from a hoist and provided with at least one annular seal projecting on its suction side, the vacuum chamber(s) enclosed by the annular seal(s) communicating with a vacuum source and a valve being present which can be switched between a suction position wherein the vacuum source communicates with the vacuum chamber(s) and a venting position wherein the communication to the vacuum source is interrupted and the vacuum chamber(s) is (are) vented or exposed to compressed air.

Such vacuum lifters are used for instance to lift and move rolls of wound bands illustratively of paper, metal, plastic or laminates, by placing the suction head, depending on its shape, against the end face or the periphery of the resp. erect or prone roll. Flat bodies too, such as slabs, can be moved by such vacuum lifters. The vacuum lifter is suspended in vertically displaceable manner from the hoist of a crane. Multiple set-ups also are possible. However also other kinds of hoists may be used, such as balancing equipment, manipulators, roll turners or the like.

A vacuum lifter of this species is described for instance in the German Gebrauchsmuster 84 35 161.6. Its vacuum head is a plane suction plate provided at its lower side with spaced, concentric annular seals. These annular seals forms vacuum chambers which they enclose and separate and which when the suction plate is deposited on the appropriate adhesion surface of the load which must be transported will form annular chambers on condition that the load form a cover means. The annular seals need not be circular, they may assume any other shape, for instance being oval or polygonal, provided they close on themselves. Nor is it necessary that they be nesting in each other. They also may enclose adjacent vacuum chambers or be distributed over several suction plates.

The vacuum chambers communicate by apertures in the suction plate with a vacuum source, for instance a vacuum pump. A valve, for instance a three-way valve, is present between the vacuum source and the vacuum chamber(s). When no load is suspended from the vacuum lifter, the valve is set in such manner that the communication with the vacuum source is interrupted and the vacuum chamber(s) is (are) vented. Additionally, it is possible to feed compressed air into the vacuum chamber(s) to facilitate raising the vacuum lifter off a deposited load. Once the vacuum lifter has been set on the load, the valve is moved into the suction position to raise this load and thereby communication is established between the vacuum source and the vacuum chamber(s). As a result, adequate adhesion has been generated to raise and move the load.

The vacuum chamber(s) should be vented immediately after depositing the load to prevent losing time for further transports. Because of his spatial separation, the crane operator is unable always to observe precisely whether the load already was deposited and whether therefore the valve shall be moved into the venting position or not.

The object of the invention is to so design a vacuum lifter of the initially cited kind that venting, or where called for the supply of compressed air, shall take place immediately upon load deposition.

This problem is solved by the invention in that the hoist is connected by a fitting to the suction plate, said fitting being vertically guided between two limit positions, and in that at least one limit switch or sensor is provided to detect the lower limit position, where said sensor so cooperates with a control means that following lowering of the fitting, the valve shall be switched into the venting position if previously it was in the suction position.

In the invention, the hoist automatically triggers the venting of the vacuum chamber(s) following load deposition by means of the vertically guided fitting suspended form the hoist and arriving at the lower limit position and by this position being detected by the sensor or limit switch. The crane operator therefore no longer need intervene, instead he relies now on the delay-free switching automation. Operational reliability also is increased thereby.

In a further development of the invention, the control means so cooperates with the hoist drive that following the lowering of the fitting, this drive shall be shut off. In this manner securing against cable slack is achieved simultaneously. An additional limit switch or sensor may be provided for that purpose.

As an alternative to the above, the problem also can be solved in that the hoist includes a force sensor so cooperating with a control means that the valve shall be switched into the venting position when the load acting on the hoist drops below a specific limit value if the valve previously was in the suction position. Proper force sensors in particular are strain gauges or piezoelectric pickups. This design accelerates the switching of the valve.

Moreover the control means can cooperate in such manner with the hoist drive that this drive shall be turned OFF when the load on the hoist drops below the above limit value. Quite feasibly a special force sensor may be provided for this purpose.

BRIEF DESCRIPTION OF THE DRAWING

The invention is illustrated in the drawing by means of an embodiment shown in schematic, vertical section. The Figure shows the left and center parts—the right part being omitted—of a vacuum lifter 1 resting on the top side 2 of an erect paper roll 3 comprising an inner winding core 4. The paper web is wound on this winding core 4.

The main part of the vacuum lifter 1 is a vacuum vessel 5 which is circular when seen in top view. It is made of a vacuum-tight weld construction and is sealed at the bottom by a suction plate 6 and at the top by a top plate 7. A center pipe 8 is inserted in the middle part and forms the inside closure of the vacuum vessel 5. Outside, the vacuum vessel 5 is sealed by a peripheral sidewall 9.

Three elastomeric circular seals 10, 11, 12 are mounted concentrically with the center, vertical axis of the vacuum lifter on the lower side of the suction plate 6. By means of these circular or annular seals lo, 11, 12 the vacuum lifter 1 rests on the top side 2 of the paper roll 3. The inner annular seal 10 is of such a large diameter that it is outside the winding core 4, whereby no spurious air can be sucked in through this winding core 4.

Together with the further out middle annular seal 11, the inner annular seal 10 forms an inner, annular vacuum chamber 13. Together with the middle annular seal 11, the outer annular seal 12 forms another annular and outer vacuum chamber 14 separated from the inner vacuum chamber 13 by the middle annular seal 11. Provided the vacuum lifter 1 evince a larger diameter, further vacuum chambers may be provided in the outward direction.

The vacuum vessel 5 communicates through a vacuum line 15 with a vacuum source 16. The vacuum source 16 is connected to a tachometric control 17 and moreover includes a check valve 18. The vacuum source 16 maintains the vacuum vessel 5 serving as reservoir at a constant, reduced pressure.

A vacuum pipe 19 starts from the vacuum vessel 5 and leads to an electromagnetic three-way valve 20. An outlet 21 fitted with a check valve 22 is hooked up to the three-way valve 20 and allows communication to the free atmosphere. Moreover a pipe 23 is connected inside which there is a control valve 24 and which issues into a through-pipe 25. The through-pipe 25 crosses the vacuum vessel 5 and is open toward the inner vacuum chamber 13.

The control valve is connected through a control line 26 to a measurement transducer 27 cooperating with a measurement pickup 28 which in turn is connected by a measurement line 29 passing through the vacuum vessel 5 with the inner vacuum chamber 13. Another control line 30 shown in dashed lines is connected to the tachometric control 17.

In the shown position of the three-way valve 20, the vacuum vessel 5 communicates through the vacuum pipe 19, the three-way valve 20, the pipe 23, the control valve 24 and the through-pipe 25 with the inner vacuum chamber 13. Said vessel therefore is at full vacuum, the vacuum being set by means of the control valve 24 at a specific value which is sensed through the measurement line 29, the measurement pickup 28 and the measurement transducer 27 and which is fed to the control valve 24 as a control value. The tachometric control 17 furthermore affects the vacuum.

If the vacuum in the inner vacuum chamber 13 must be eliminated, then the three-way valve 20 will be switched over. In this manner the pipe 23, the through-pipe 25 and thereby the inner vacuum chamber 13 are connected through the check valve 22 with the atmosphere, that is, the inner vacuum chamber 13 is being vented. At the same time the previous connection between the vacuum line 15 and the pipe 23 is interrupted, i.e., the vacuum in the vacuum vessel 5 is maintained.

A hollow vacuum housing 31 is deposited in the outer zone on the top plate 7 of the vacuum vessel 5. The inside space 32 of said housing 31 communicates by a through-pipe 33 crossing the vacuum vessel 5 with the inner vacuum chamber 13, that is, the inside space 32 is at the same pressure as the inner vacuum chamber 13.

At its lower side the vacuum housing 31 comprises a valve aperture 34 cooperating with the a valve head 35. The valve head 35 is affixed to a hollow valve rod 36 open at its top and bottom ends. By its upper end the valve rod 36 is seated in a valve-rod guide 37. Another valve-rod guide, not shown herein, is present in the vicinity of the lower end of the valve rod 36. In the region of the inside space 32, the valve rod 36 is enclosed by a compressive helical spring 38 resting at its top side against the valve-rod guide 37 and at its bottom side against a collar 39 above the valve head 35. Accordingly the valve head 35 is stressed by the compression spring toward the valve aperture 34.

The valve aperture 34 continues downward into a filter pipe 40 crossing the vacuum vessel 5 and issuing into the outer vacuum chamber 14. A filter insert 41 is present in the filter pipe 40 and through it passes suction air from the outer vacuum chamber 14 when the valve head 35 is raised off the valve aperture 34.

A guide tube 42 is affixed outside on the sidewall of the vacuum vessel 5 and inside it a sensor pin 43 is held in relatively loose manner so as to be vertically displaceable. Said pin is located directly against the outside of the outer annular seal 12.

An actuation rod 44 is supported in vacuum-tight manner above and in the axial extension of the sensor pin 43 in the lower and upper wall of the vacuum housing 31. It is enclosed in the region of the inside space 32 of the vacuum housing 31 by a compressive helical spring 45 generating the same force as the helical spring 38 of the valve rod 36. The helical spring 45 rests against the upper wall of the vacuum housing 31 and at the bottom side against a fork lever 46 rigidly mounted to the actuation rod 44. The fork lever 46 extends horizontally as far as the valve rod 36 and there it engages in geometrically locking manner between the collar 39 and the valve head 35. As a result the valve head 35 follows the motions of the actuation rod 44.

The actuation rod 44 projects upward and out of the vacuum housing 31 into a balancing piston 48 moving in sealed manner inside a balancing cylinder 47, the piston surface corresponding to the surface of the valve head 35. The space above the balancing piston 48 is connected through the balancing line 49 with the valve rod guide 37. The space underneath the balancing piston 48 communicates through a balancing borehole 50 with the inside chamber 32 of the vacuum housing 31.

As regards larger vacuum lifters with additional, outer vacuum chambers, an above system will be provided for each vacuum chamber, the particular vacuum housings communicating with the particular nearest inner vacuum chamber.

In the Figure shown, the sensor pin 43 is in its lowermost position because the diameter of the paper roll 3 precisely coincides with the outer diameter of the outer annular seal 12. Accordingly, when the vacuum lifter 1 is deposited on the paper roll 3, the valve head 35 shall not be raised. The vacuum forces in the inside space 32 acting on the valve head 35 in the sense of opening and the vacuum forces acting through the balancing borehole 50 on the lower side of the balancing piston 48 balance because of the essentially coinciding diameters of the valve head 35 and balancing piston 48, that is, the actuation rod 44 and hence the fork lever 46 are pressed down by a force corresponding to that acting on the valve head 35 in the sense of opening. Because of this balance, the valve head 35 is pressed onto the valve aperture 34 merely by the helical springs 38, 45.

As a rule the diameter of the paper roll 3 will not coincide—as it does in the Figure—precisely with the outside diameter of the outer annular seal 12. If the diameter is larger, the sensor pin 43 will not yet be actuated when the vacuum lifter 1 is being deposited because said pin projects less downward than do the annular seals 10, 11, 12—even though the latter are somewhat compressed by the weight proper of the vacuum lifter 1. It is only after the three-way valve 20 has been moved into the shown position and thereby the vacuum chamber 13 has been subjected to full vacuum that the annular seals 10, 11, 12 shall be compressed to such an extent that the sensor pin 43 comes to rest against the top side of the paper roll and even shall be forced up. Thereby it also spans the distance between its upper end and the lower end of the actuation rod 42 which it drives along.

Thereupon the valve head 35 is raised by the fork lever 46 from the valve aperture against the action of the helical springs 38, 45. In this manner the outer vacuum chamber 14 also is set at vacuum through the filter pipe 40, the valve aperture 34, the vacuum housing 31 and the through-pipe 33. When the valve head 35 is raised, pressure balance takes place at its top and bottom sides and in the absence of further steps, the vacuum force acting on the lower side of the balancing piston 48 would tend to force the actuation rod 44 and hence also the valve rod 35 down again. However, the valve rod 36 being hollow and there being communication through the balancing line 49 to the balancing cylinder 47, the space above the balancing piston 48 also is evacuated and thereby the initially extant pressure difference is eliminated.

As already described above, the inner vacuum chamber 13 shall be vented by actuating the three-way valve 20 after the paper roll 3 has been deposited. This venting also is exerted on the inside space 32 of the vacuum housing 31 and hence on the outer vacuum chamber 14 because the valve head 35 is still open. When raising the vacuum lifter 1, the sensor pin 43 again moves out of its guide tube 42 and both the valve head 35 and the actuation rod 44 descend again on account of the actions from the helical springs 38 and 45 resp. until the valve head 35 has closed the valve aperture 34.

The above described situation presumes that the paper roll 3 is of a diameter larger than shown, whereby the sensor pin 43 shall be raised in the process of deposition. This is not the case in the above embodiment and therefore the sensor pin 43 remains in its downward projecting position. Consequently the valve aperture 34 remains closed even though the outer vacuum chamber 14 has been sealed by the top side 2 of the paper roll 3 and might be set at vacuum. However the inner vacuum chamber 13 is so dimensioned in its surface that in such cases the suction it exerts is sufficient to lift the paper roll 3 and to transport it while it is suspended, whereby no vacuum need be applied in such cases to the outer vacuum chamber 14. Nevertheless when the vacuum lifter 1 is deposited and then raised again, there arises the problem that on account of the elastic behavior of the annular seals 11, 12, a vacuum arises in the outer vacuum chamber 14, and that, in contrast with the case of the vented inner vacuum chamber 13, no air can follow. This may lead to dragging along the paper roll 3 when the vacuum lifter 1 is being raised until the vacuum formed in the outer vacuum chamber has been eliminated to such an extent by air slowly seeping through the material of the paper roll 3 that the paper roll 3 no longer can be borne. Thereupon it crashes randomly.

To prevent such an occurrence, a compressed-air source 51 is provided and is connected through a compressed-air line 52 with a compressed-air reservoir 53 and through a solenoid valve 54 with the inside space 32 of the vacuum housing 31. As a rule the solenoid valve 54 is closed. Following deposition of the paper roll 3 and switching of the three-way valve into the venting position, the solenoid valve 54 is opened by an automatic control means, not shown herein in further detail, after the pressure in the vacuum chamber 13 has risen to nearly atmospheric.

As a result the inside space 32 of the vacuum housing 31 is raised to excess pressure and also the inner vacuum chamber 13 through the cross-pipe 33. Because of the check valve 22, the air cannot escape through the pipe 23 and through the three-way valve 20 in the venting position. The excess pressure building up in the inside vacuum chamber 13 is enough to raise the vacuum lifter 1 off the paper roll 3 and to overcome the vacuum force forming in the outer vacuum chamber 14 because of the elastic behavior of the annular seals 11, 12. Therefore the paper roll 3 no longer is dragged along in unwanted manner. The supply of compressed air is stopped as soon as the vacuum lifter 1 has been raised, and this mechanism is automatically controlled by suitable pressure sensors.

While not shown herein, the vacuum lifter 1 is centrally suspended from a crane travel works. The lower pulley of said works is connected to a support bolt 55 resting displaceably by means of slide blocks 56 in a vertical guide 57. The support bolt 55 is widened at its lower side and thereby rests upward against a disk spring 58. A limit switch 59 is mounted in the lower part of the vertical guide 57 and will be actuated when the slide blocks 56 arrive in their lower end position. The limit switch 59 is coupled by a control means not shown herein with the three-way valve 20.

As the paper roll 3 is being deposited, the crane travel works becomes slack, whereby the slide blocks 56 together with the support bolt 55 will drop. Upon actuation of the limit switch 59, the three-way valve 20 is switched from the shown position, wherein the inner vacuum chamber 13 is at vacuum, into the venting position, so that the inner vacuum chamber 13 automatically is made to communicate with the atmosphere. Another limit switch, omitted here, is connected to the crane travel works to secure against cable slackening and turns said works automatically off. Additionally the limit switch 59 may be connected also with the solenoid valve 54 of the compressed-air source 51, whereby simultaneously the inside vacuum chamber 13 is not only vented, but also fed with compressed air. Thereupon the vacuum lifter 1 can be raised off the paper roll 3.

A control means ensures that when the slide blocks 56 leave the limit switch 59, the three-way valve 20 shall not be switched, rather that this switching shall take place only after renewed lowering of the vacuum lifter 1 onto another paper roll and hence lowering of the slide blocks 56 onto the limit switch 59. However another logic circuitry may be provided, or else the three-way valve may reset into the vacuum position only by the operator.

Additionally the vacuum lifter 1 comprises an emergency vacuum source 60 communicating through an emergency vacuum line 61 with the inside space of the vacuum vessel 5. The emergency vacuum source 60 also is secured by a check valve 62. The emergency vacuum source 60 is driven by a DC motor 63 connected through a pressure switch 64 with a battery 65. The battery 65 is connected to a permanently powered battery charger 66 and in this way is continuously kept optimally charged.

The pressure switch 64 is connected to a measurement pickup 67 in turn connected through a measurement line 68 to the inside space of the vacuum vessel 5. The measurement transducer 67 is set in such a way that it will emit a closing pulse to the pressure switch 64 designed as a solenoid switch when it senses through the measurement line 68 that the vacuum in the vacuum vessel 5 has dropped below a specified minimum value.

As a result the DC motor 63 and hence the emergency vacuum source 60 are started to compensate the vacuum drop in the vacuum vessel 5 and the normal vacuum level is again achieved. Simultaneously a malfunction alarm is emitted through a signal generator 69 to make sure the operator knows that the vacuum generated by the vacuum source 16 is insufficient to transport the paper roll 3.

Furthermore a remote-control line 70 starts at the pressure switch 64 to allow an operator to actuate the pressure switch 64 also independently from or alternatively to the above automation and thereby to start the emergency vacuum source 60.

Illustratively a drop in vacuum may arise by failure of the vacuum source 16 or also due to the degradation of the vacuum gripping of a paper roll 3 due to its time-dependent visco-elastic and hygroscopic behavior to such an extent that the vacuum source 16 no longer suffices for vacuum production. In that case the emergency vacuum source 60 acts as a booster. Additionally, the emergency vacuum source 60 also may be turned on additionally by an operator as appears necessary.

Moreover "vacuum" in the sense of this description means a pressure less than atmospheric.

We claim:

1. A lifter system, comprising:
   a) a crane hoist, including a drive having an operably associated vertically displaceable member;
   b) a fitting connected to said member and displaceable therewith;
   c) means operably associated with said fitting for guiding said fitting vertically in response to displacement of said member between vertically spaced first and second positions;
   d) a suction head secured to said fitting and displaceable therewith, at least a first annular seal projecting from said head for defining therewith a vacuum chamber;
   e) a vacuum source communicating with said chamber for applying a vacuum thereto;
   f) a valve interposed between said source and said chamber which can be switched between a suction position wherein a vacuum is applied to said chamber and a venting position wherein said chamber is vented;
   g) detection means operably associated with said guiding means for determining whether said fitting has attained said second position, said second position indicative of a load carried by said suction head having been set down; and
   h) control means operably associated with said detection means, said valve, and said drive for shutting said drive off and causing said valve to vent said chamber when said fitting has attained said second position.

2. The system of claim 1, wherein:
   a) said detection means is one of a limit switch and sensor.

3. The system of claim 2, wherein:
   a) said detection means is proximate said second position.

4. The system of claim 1, wherein:
   a) said fitting includes a support bolt operably associated with at least a first slide block.

5. The system of claim 4, wherein:
   a) said guiding means includes a vertical guide extending from said suction head; and
   b) said support bolt and slide block are displaceably mounted within said vertical guide.

6. The system of claim 5, wherein:
   a) a disk spring is positioned within said vertical guide and rests upon said support bolt.

7. The system of claim 1, wherein said suction head includes:
   a) a top plate, a suction plate, and a peripheral side wall extending about and between said plates for therewith defining a vacuum vessel;
   b) said fitting operably associated with said top plate; and
   c) said seal projecting from said suction plate.

8. The system of claim 7, wherein:
   a) a center pipe is positioned with said vessel and extends between said plates for therewith forming an inside closure for said vessel; and
   b) said fitting is aligned with said center pipe.

9. The system of claim 8, wherein:
   a) there are at least two seals including a first seal and a second seal projecting from said suction plate, said first seal being radially outwardly spaced from said center pipe and said second seal being radially outwardly spaced from said first seal.

10. The system of claim 9, wherein:
    a) each of said seals is compressible.

11. A lifter system for transporting a load, comprising:
    a) a crane hoist, including a drive having an operably associated vertically displaceable member;
    b) a fitting connected to said member and displaceable therewith;
    c) means operably associated with said fitting for guiding said fitting vertically in response to displacement of said member between vertically spaced first and second positions;
    d) a suction head secured to said fitting and displaceable therewith, at least a first annular seal projecting from said head for therewith defining a vacuum chamber;
    e) a vacuum source communicating with said chamber for applying a vacuum thereto;
    f) a valve interposed between said source and said chamber which can be switched between a suction position wherein a vacuum is applied to said chamber and a venting position wherein said chamber is vented;
    g) a force sensor operably associated with said hoist for sensing the load acting on the hoist; and
    h) control means operably associated with said drive, said valve, and said force sensor for shutting said drive off and causing said valve to vent said chamber when the load acting upon the hoist drops below a limit value.

12. The system of claim 11, wherein:
    a) said force sensor includes one of a strain gauge and a piezoelectric pickup.

13. The system of claim 11, wherein:
    a) said valve is a solenoid-actuated three-way valve.

14. The system of claim 13, wherein said suction head includes:
    a) a top plate, a suction plate, and a side wall extending about and between said plates for therewith defining a vacuum vessel; and
    b) there are at least two seals projecting from said suction plate for therewith defining said vacuuming chamber.

15. The system of claim 14, wherein:

a) a center pipe extends between said plates and within said vessel for defining an inside closure for said vessel; and d) each of said seals is outwardly spaced relative to said pipe.

16. The system of claim 15, wherein:

a) said vacuum source causes a vacuum to be continuously applied to said vessel.

17. The system of claim 16, wherein:

a) each of said seals is compressible.

18. The system of claim 17, wherein:

a) a through-pipe extends between said plates and communicates with said chamber;

b) said through-pipe is in communication with said vacuum source; and c) said valve is interposed between said through-pipe and said source.

19. The system of claim 18, wherein:

a) a check valve is downstream of said valve for permitting said through-pipe to vent to atmosphere.

* * * * *